(12) United States Patent
Kubsch et al.

(10) Patent No.: US 7,991,855 B2
(45) Date of Patent: Aug. 2, 2011

(54) METHOD FOR ASSIGNING AN IDENTIFIER TO A PEER-GROUP IN A PEER-TO-PEER NETWORK

(75) Inventors: Stefan Kubsch, Hohnhorst (DE); Meinolf Blawat, Hannover (DE); Wolfgang Klausberger, Hannover (DE); Axel Kochale, Springe (DE); Marco Winter, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 1308 days.

(21) Appl. No.: 10/849,461

(22) Filed: May 19, 2004

(65) Prior Publication Data
US 2005/0021793 A1    Jan. 27, 2005

(30) Foreign Application Priority Data

May 23, 2003 (EP) .................. 03011674
Sep. 5, 2003 (EP) .................. 03020120

(51) Int. Cl.
G06F 15/177 (2006.01)
G06F 15/173 (2006.01)
G06F 7/04 (2006.01)
H04L 12/28 (2006.01)

(52) U.S. Cl. ............ 709/220; 709/226; 370/254; 726/3

(58) Field of Classification Search .................. 709/238, 709/243, 220, 226; 370/254; 726/3
See application file for complete search history.

(56) References Cited

U.S. PATENT DOCUMENTS

| | | | | |
|---|---|---|---|---|
| 6,064,297 | A | * | 5/2000 | Odinak et al. ........... 340/310.11 |
| 6,904,467 | B1 | | 6/2005 | Takemura |
| 7,065,587 | B2 | * | 6/2006 | Huitema et al. .............. 709/245 |
| 7,206,934 | B2 | * | 4/2007 | Pabla et al. .................... 713/168 |
| 7,318,051 | B2 | * | 1/2008 | Weston et al. .................. 706/12 |
| 7,533,141 | B2 | * | 5/2009 | Nadgir et al. ................. 709/200 |
| 2004/0064511 | A1 | * | 4/2004 | Abdel-Aziz et al. .......... 709/206 |
| 2004/0073659 | A1 | * | 4/2004 | Rajsic et al. .................. 709/224 |
| 2005/0086300 | A1 | * | 4/2005 | Yeager et al. ................. 709/204 |

FOREIGN PATENT DOCUMENTS

JP 2000-295294 10/2000
WO 01/97447 A2 12/2001

* cited by examiner

*Primary Examiner* — Ranodhi N Serrao
(74) *Attorney, Agent, or Firm* — Robert D. Shedd; Joseph J. Opalach; Jerome G. Schaefer

(57) ABSTRACT

Networks may be implemented using peer-to-peer technology. A plurality of peers may form a peer-group, having a unique group label. To relieve the user from administrative tasks, some configuration routines for such networks may be automated. A peer-group may select one of its peers as negotiation peer, having the task to communicate with other peers, e.g. negotiation peers from other peer-groups. When merging or splitting peer-groups, the group label is usually modified. But it may be advantageous to keep the group label. If a new peer-group in a peer-to-peer network is created by merging or splitting of peer-groups, a method for selecting a group label for the new peer-group comprises determining a negotiation peer, exchanging information between the negotiation peers in the case of merging, comparing features of the two peer-groups and assigning the label of one of the peer-groups to the new peer-group.

6 Claims, 2 Drawing Sheets a)

b)

METHOD FOR ASSIGNING AN IDENTIFIER TO A PEER-GROUP IN A PEER-TO-PEER NETWORK

This application claims the benefit, under 35 U.S.C. 119, of German patent application No. 03011674.3 filed May 23, 2003, and German patent application No. 0320120.6 filed Sep. 05, 2003.

FIELD OF THE INVENTION

This invention relates to a method for selecting an identification label for peer-groups in peer-to-peer networks.

BACKGROUND

The increasing importance of networked devices and home networks for the consumer electronics industry forces immense administrative efforts by the devices, but also by the user, and may lead to PC like configuration and administration routines in such home networks. Generally, networks can be classified as having either client-server or peer-to-peer (P2P) architectures. In P2P based networks a device or network node is also referred to as a peer. Usually each peer can be unambiguously addressed through a unique label or identifier, e.g. a so-called Universal Unique Identifier (UUID). The peers in P2P networks may communicate directly with each other, so that no central network organization is required, and further may cooperate with each other, sharing services and resources and thus forming a so-called peer-group. Usually the peer-group as such gets a dedicated label, e.g. UUID, which can be used for identifying the members of the group. It can therefore also be used as an address to the peer-group. This label is usually changed when the structure of the peer-group is modified, e.g. a peer is added or removed. The described peer-to-peer networks and mechanisms are in a detailed manner published e.g. in WO 02/057917 A2.

Peers can be connected to the network or disconnected from the network at any time. Particularly home networks are highly dynamic systems, where peers are joining and leaving arbitrarily the system, or peer-groups are split or merged.

A method for building a home network using P2P technology is described in the not pre-published European Patent application EP02027122.7. According to the mentioned application, a home network can be implemented as a peer-group, by assigning a common group label to the peers. The resulting peer-group is called OwnerZone, and the common group label is called Zone_UUID. Communication between nodes is only allowed if they belong to the same OwnerZone, or to a specified so-called trusted zone. The OwnerZone concept aims at devices that may automatically set up a home network, with only minimal or no administration to be done by the user. According to the mentioned application, the peers may autonomously 'negotiate' their new Zone_UUID after any network modification. However, there is no method defined for automatically specifying a Zone_UUID for the new peer-group.

The mentioned document further describes that an OwnerZone offers a service for providing information regarding its structure and/or contents, referred to as Zone_Info_Data and being marked with a unique label. The database for Zone_Info_Data can be updated automatically and may contain information like e.g. Zone_UUID or Zone_Service_List. The Zone_Service_List defines which services the OwnerZone may offer. It may also define in detail which services shall be accessible for which trusted zones.

When the structure of an OwnerZone changes, e.g. a peer is connected or disconnected, or two OwnerZones are merged into a single new OwnerZone, then new Zone_Info_Data is generated in order to describe the structure and contents of the new OwnerZone. For example, the new Zone_Info_Data may contain information about both source OwnerZones, e.g. their respective Zone_UUIDs, and thus make it possible to track on OwnerZone modifications.

SUMMARY OF THE INVENTION

In the case of changing the structure of an OwnerZone by adding or removing one or more peers, administrative work must be conducted. Usually the user is required to perform this administrative work, which may be an annoying task, require special networking knowledge, and lead to a high amount of administrational data traffic. This is because the new identifier acts as an address of the peer-group, and must be distributed in the network. Particularly when automating this administrative work, the involved peers or zones must have a common methodology to decide upon an identifier for the new OwnerZone, like a group label or Zone_UUID, or other labels like Zone_Name if applicable.

The problem to be solved by this invention is to determine automatically a common identifier for a peer-group, e.g. an OwnerZone, after the structure of the peer-group was changed, either by adding or by removing one or more peers. This is a part of what is called Zone Management. A precondition to be kept is that in this case the amount of administrational work and data traffic shall be minimized. Such method is disclosed in claim 1.

The invention defines suited parameters and algorithms for automatically determining an identifier for a peer-group, while simultaneously minimizing the amount of data traffic required for distribution of the new identifier. According to the invention, the best-suited existing group identifier is determined and reused. Advantageously, the inventive method can be used when the structure of an OwnerZone is changed by adding or removing peers, and when a new OwnerZone is created by splitting or merging OwnerZones.

The inventive method comprises selecting an OwnerZone identifier, like Zone_UUID, in consideration of the peer and zone characteristics. The term 'durability' is used herein to reflect the zones resistance against a friendly takeover by other zones. When two zones shall be merged, the durability of a zone determines the importance of each zone, or how strong its impact on the newly created zone may be. Also a single peer may be understood as an implicit OwnerZone, so that the method may also be used when a single peer is added to or disconnected from a peer-group.

According to the invention, a single peer, herein referred to as 'negotiation peer', is automatically selected within a newly created peer-group, using any arbitrary method for determining a node for executing a service. The task of the negotiation peer is to execute the zone management service in the case of changing the structure of the peer-group, e.g. merging the peer-group with another peer-group or with a single peer. This negotiation peer has the required information about the structure and capabilities of the OwnerZone, e.g. it may have access to the Zone_Service_List and Zone_Info_Data, in order to get the contained information characterizing the peer-group. Further the invention comprises that every peer in the peer-group that receives information regarding a structural change forwards this information to its negotiation peer. Then the two negotiation peers of the two peer-groups to be merged may exchange relevant parts of their information, and determine the common identifier for the new peer-group. This is possible if both execute the same determination procedure, based on the same data. As a result, the new OwnerZone keeps the identifier, e.g. Zone_UUID, of one of the source zones, namely the source zone with the higher durability. This is particularly advantageous if a peer-group with a connection to other peer-groups is rearranged, e.g. a peer is added or removed, because in this case the identifier, and thus the peer-group's address, may remain unchanged. This eliminates the necessity to publish a new address to the other peer-groups, which reduces network traffic and administrational activities.

The procedure of determining the identifier for the new peer-group comprises asserting certain durability to each of the source OwnerZones, and may consist of multiple steps, divided in multiple groups of steps.

The first group of steps investigates the most important features of the OwnerZone, e.g. regarding its external connections. The existence of these features is scanned through sequentially in a predefined order, such that if any feature exists only in one of the source OwnerZones, the durability of this OwnerZone is higher and thus its Zone_UUID is assigned to the new merged OwnerZone. The determination procedure may in this case be finished. This may also be understood as rating the features such that any feature belonging to the first group is rated higher than the sum of all lower rated features.

The second group of steps rates other OwnerZone features by quantification. These steps need only be performed if the first group of steps gave the same result for both source zones. Each of the respective quantifiable features is asserted a certain value, and the values are added for each of the source zones. The source zone with the higher resulting sum value has the higher durability, and its identifier is used as identifier of the new OwnerZone.

The features considered in the first group of steps may comprise external access, or existence of trusted zones, existence of user specific configuration and current zone behavior, or at least some of these. The second group of steps may consider features like the type and number of services that the OwnerZone may offer to other zones, the peer-group size, i.e. number of connected peers, peer-group lifetime or available storage capacity.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 two peers being connected to form a common OwnerZone.

DETAILED DESCRIPTION OF THE INVENTION

Figure 1:
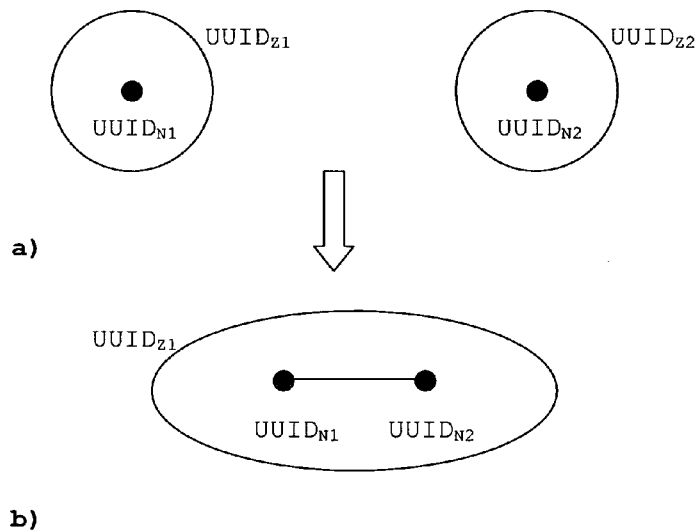

FIG. 1a) shows two nodes of a peer-to-peer network, being labeled $UUID_{N1}$ and $UUID_{N2}$ respectively. The nodes belong to different OwnerZones, and thus have associated individual group labels $UUID_{Z1}$, $UUID_{Z2}$. Therefore they may generally not communicate with each other. When the nodes are physically connected to each other, as shown in FIG. 1b), the users of the respective OwnerZones may be prompted about whether they want to merge their OwnerZones. In another embodiment of the invention the respective users are not prompted, but may explicitly call a service for this purpose. Thus a common OwnerZone may be created, which requires assigning a common group label to the nodes. Using the inventive method allows the nodes to select autonomously such a group label.

Particularly, one of the existing group labels $UUID_{Z1}$, $UUID_{Z2}$ is used as common group label. The nodes may periodically send messages, thus detecting each other soon. The communicating nodes $UUID_{N1}$, $UUID_{N2}$ are the negotiation peers. According to the invention, both nodes exchange information about their respective OwnerZones with each other, e.g. parameters like their zone labels $UUID_{Z1}$, $UUID_{Z2}$, the number of nodes belonging to their respective groups and whether they have trusted zones, i.e. if they may connect to nodes belonging to other OwnerZones. Then each negotiation peer compares the received information with its own, i.e. with the information it has transmitted, and performs a rating. Both nodes $UUID_{N1}$, $UUID_{N2}$ use the same rating algorithm, based on the same data and thus giving the same result. Usually one of the nodes, e.g. $UUID_{N2}$, detects from this result that the other node is rated higher, and it overwrites its own group label $UUID_{Z\_2}$ with the higher rated node's group label $UUID_{Z1}$. Thus both nodes have the same group label, and therefore belong to the new common OwnerZone. A critical situation may occur when both nodes are rated equally. Comparing individual lowest-rated parameters can avoid this, e.g. the value of an internal lifetime counter with millisecond resolution, or the numerical value of the node label (Node_UUID) or the Zone label (Zone_UUID).

The OwnerZone concept includes also that the connected nodes need not be located close to each other, but they may be connected via a network. E.g. two nodes belonging to the same user are located in different buildings, and are connected to a global net. When the user wants to create a common OwnerZone, he must specify for the nodes that they may communicate with each other. Then the nodes may select a common group label, as described before. This concept can also be used to merge two OwnerZones belonging to different users, and therefore requires security measures in order to prevent hostile takeovers. Security may be increased by various means, e.g. the respective users of each OwnerZone may be required, in advance or online, to explicitly accept the merging.

The described algorithm can be understood such that each of the nodes $UUID_{N1}$, $UUID_{N2}$ offers a certain service for zone management. According to the invention, the owner zone provides the zone management service, and one node within the group has to perform or offer this service. For peer-groups comprising more than one node this zone management service is automatically associated with only one of the nodes of the group at a time. This node is called herein 'negotiation peer', since the described process is similar to a negotiation. An easy way to determine the negotiation peer is to select one of the nodes being involved in the previous merge process or negotiation, e.g. the node that kept its group label.

Figure 2:
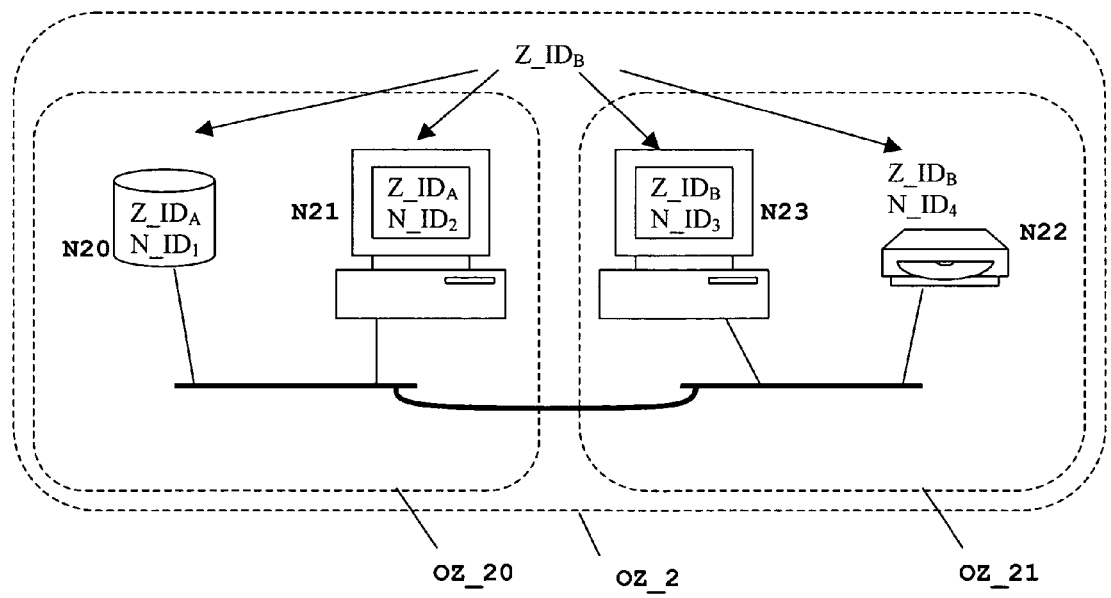
FIG. 2 two OwnerZones, both having negotiation peers, being merged to a new OwnerZone.

FIG. 2 shows two OwnerZones OZ_20, OZ_21, each of which consisting of two nodes. While all nodes N20, ..., N23 have individual node identifiers $N\_ID_1, \ldots, N\_ID_4$, the nodes N20, N21 belonging to the first OwnerZone OZ_20 are labeled with the first OwnerZone's group label $Z\_ID_A$, and the nodes N22, N23 belonging to the other OwnerZone OZ_21 are labeled with the other OwnerZone's group label $Z\_ID_B$. One of the nodes of each OwnerZone OZ_20, OZ_21, e.g. N21 and N23, is the negotiation peer, and thus performs the zone management service for the respective peer-group. When the users of the first and second OwnerZone want to unify their peer-groups in order to create a common OwnerZone, the user of the first OwnerZone OZ_20 may authorize his negotiation peer N21 to contact the other peer-group OZ_21, being specified by its group label $Z\_ID_B$. The negotiation peer N21 sends a message to the other OwnerZone OZ_21, where the negotiation peer N23 analyzes the message and requests a confirmation by its respective user. E.g. it may also request the user to enter a secret keyword that is valid only for this purpose and must be decided upon by the users of the first and second OwnerZone OZ_20, OZ_21 in advance. If both users agree to merge their OwnerZones, then the negotiation peers N21, N23 exchange information about their respective OwnerZones OZ_20, OZ_21, e.g. data about their connections, structures and capabilities, and determine the respective durabilities, e.g. as described in detail below. Both come to the conclusion that e.g. the second OwnerZone OZ_21 is rated higher than the first OZ_20, i.e. has higher durability. Then the negotiation peer N21 of the OwnerZone OZ_20 with lower durability asserts the new common group label $Z\_ID_B$ to the nodes N20, N21 of its peer-group. Further, the node N21 deactivates its zone management service, since the other negotiation peer N23 performs this service now for the new peer-group OZ_2. Anyway, authorized users may also assign the service to any other node within the OwnerZone.

Analogously, FIG. 2 can also be used to explain the reverse process of splitting an OwnerZone. When the user of an OwnerZone OZ_2 decides to split the OwnerZone, there are two possible ways to execute the process. One possibility is that the user performs a controlled split into two groups OZ_20, OZ_21, e.g. by creating a list of the nodes to be connected to the first OZ_20 and the second OZ_21 partial group, and then lets a dedicated service, e.g. also the negotiation service, perform the split process at a specified time. This may also be used for splitting the OwnerZone into more than two partial groups, and for disconnecting a single peer from the OwnerZone in a controlled way. According to the invention, the negotiation peer has the task to assign the existing group label $Z\_ID_B$ to only one of the partial groups OZ_20, OZ_21, namely the one that has higher durability than the other. Then another group label must be assigned to the other partial group. Advantageously, the negotiation peer may use the same durability calculation as for merging, compare the features of the first and second partial groups OZ_20, OZ_21, and thus decide which has higher durability.

The other possibility to perform the split process is that one or more nodes are simply disconnected from the zone, e.g. by removing a network cable. In this case each node in the network may detect the situation because according to standard P2P protocols the nodes send and receive discovery messages. Thus each node may detect to which other nodes it is connected. The OwnerZone may be configured to handle this situation, e.g. by always storing a copy of the Zone_Info_Data database in all nodes. After a split of the OwnerZone OZ_2 into two partial zones OZ_20, OZ_21, each partial zone OZ_20, OZ_21 may determine an own negotiation peer, e.g. N21 for OZ_20 and N23 for OZ_21. The negotiation peers N21, N23 may calculate the durability of their own peer-group and the durability of the other part, since the copy of the Zone_Info_Data database contains information about both partial groups. Furthermore, since both partial groups OZ_20, OZ_21 have the same data and use the same algorithm, they come to the same result, and may assign the group label $Z\_ID_B$ of the previous peer-group, before being split, to the partial group with the higher durability. The other partial group may calculate and assign to itself another group label. In FIG. 2 the OwnerZone OZ_2 before the split had the group label $Z\_ID_B$, and after the split one partial group OZ_20 comprises nodes N20 and N21 while the second partial group OZ_21 consists of nodes N22 and N23. The durability calculation is performed identically by the two negotiation peers, e.g. N21 and N23, and leads to the result that e.g. the durability of the second partial group OZ_21 is higher than that of the first partial group OZ_20. Then, according to the invention, the second partial group OZ_21 having higher durability keeps the group label $Z\_ID_B$, while the first partial group OZ_20 gets another group label $Z\_ID_A$. Particularly in the case when a single peer is disconnected, the remaining peer-group will usually keep its group label. This has the advantage that the user needs not care about the internal organization of his home network, and that it is not necessary to distribute a new group label, or OwnerZone address, over the network to e.g. trusted zones when a peer is added or removed.

An important aspect of the invention is the negotiation process, which comprises the calculation of the OwnerZones durability. This means that the negotiation peers perform for each OwnerZone a rating according to a defined method. The durability of the own peer-group can be calculated at any time, preferably whenever a relevant parameter of the peer-group is changed, e.g. memory is allocated for any purpose, a node is disconnected or an additional service is installed. According to the invention, the calculation of durability is done in at least two steps: in the first of these steps predefined parameters are compared in a predefined order, and every parameter has a defined weight. The weight is higher than the total weight of all lower rated parameters, i.e. the comparison may be stopped when a parameter applies only to one node. E.g. the first parameter to be compared is whether a node has trusted zones or not, i.e. if it may connect to external peers. Other criteria are e.g. if the respective databases for Zone_Info_Data are automatically generated or user manipulated, or what services the OwnerZones may offer to each other. User manipulated Zone_Info_Data may contain information that should also be available for the new OwnerZone. Additionally, one of the users or both may have the possibility to influence the process or explicitly decide which label to use, and this may have the highest or a lower priority.

Figure 3:
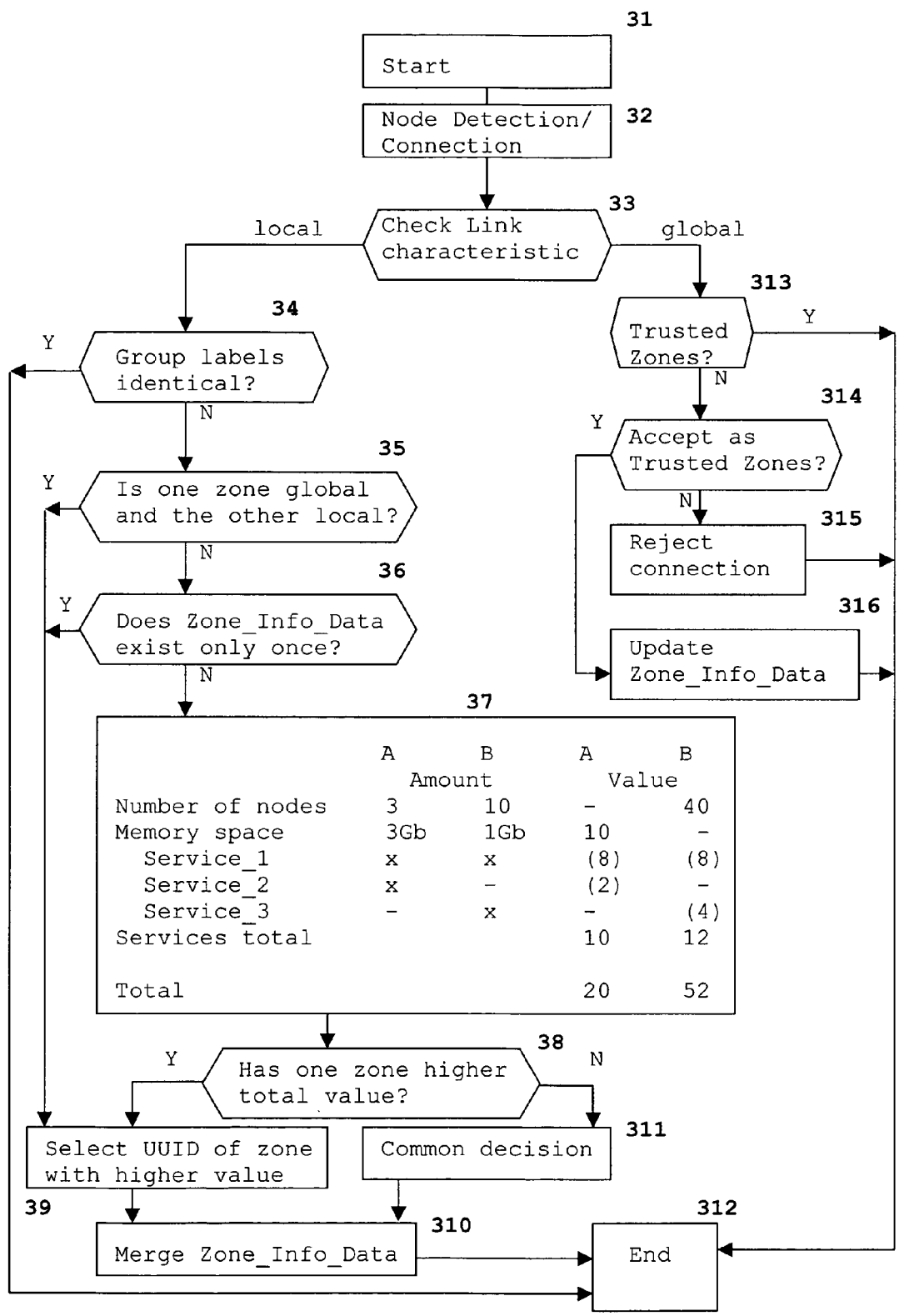
FIG. 3 an exemplary flow diagram for determination of the new OwnerZone's identifier.

An exemplary flow diagram specifying the negotiation process for merging is shown in FIG. 3. When a negotiation peer receives a request for communication, the zone management service starts 31 a negotiation procedure, beginning with node detection 32, i.e. determining the transmitting node's group label. Then the type of relationship between the two OwnerZones is evaluated 33. This may require the user to confirm that a connection to the other node may be established, data exchanged and a merge performed. If the user accepts, the connection to the other negotiation peer is regarded as a local connection, and the durability calculation may begin. A special situation occurs if e.g. a new peer is added to an existing P2P network via a local connection. In this case the peer may be programmed by the manufacturer to allow negotiation and merging. Otherwise, if a request for communication is received via a global connection, the negotiation peer checks 313 if the node that has transmitted the request message belongs already to a trusted zone. In this case, the negotiation is finished since the OwnerZones may communicate with each other. Otherwise, if the node that has transmitted the message does not belong to a trusted zone yet, the receiving negotiation peer analyzes 314 if the message contains a request to establish a trusted zone relationship between the two OwnerZones. This will usually also require a user confirmation, and if both users accept a trusted zone relationship to be established, the internal database for Zone_Info_Data is updated 316. Otherwise the connection is rejected 315.

If the connection to the other negotiation peer is regarded as a local connection, the two negotiation peers exchange the data that are required for the durability calculation, and the calculation can be performed. An initial check 34 verifies if the message comes from another peer-group, e.g. a peer that was not connected to this OwnerZone before. In one embodiment of the invention a peer that is disconnected from an OwnerZone keeps the OwnerZones' group label. If the peer is reconnected, the negotiation may be finished after this step 34 because the group labels are identical.

According to the invention, at least two groups of characteristics or parameters are evaluated to find out which OwnerZone has the higher durability. In the embodiment shown in FIG. 3 the first of these groups contains two characteristics: the first is if the OwnerZones have external connections or trusted zones 35. If only one of the two OwnerZones may connect to external nodes, then the group label or Zone_UUID of this OwnerZone is selected 39 for the new OwnerZone. If both OwnerZones may connect to external nodes for any reason, but only one has trusted zones, then the group label of this OwnerZone is selected. The second characteristic 36 is if both OwnerZones to be merged have a Zone_Info_Data service. This could be not the case, e.g. there may be certain devices that are not prepared for being a negotiation peer. If only one of the two OwnerZones has a Zone_Info_Data service, then the group label of this OwnerZone is selected 39.

The second group of characteristics 37 is only evaluated if the first group gave no decision about which group label to select. The characteristics of the second group 37 are rated with values, i.e. they are quantified in a sense that every evaluated item may win points, and the points for all items are summed up for each peer-group. In this example these items comprise the number of nodes that belong to the OwnerZones, the available memory space and the type of available services. Other examples are the number of trusted zones, or the number of nodes belonging to trusted zones. Any items are possible for the second group of items 37, as long as its evaluation comprises assigning a value to the item and summing up the values for each OwnerZone. This means that the items within this group do not have an order, since all must be compared.

The group label is then taken 39 from the peer-group that has more points, or a higher value. This decision 38 may also yield that both have the same value. Then any decision 311 is taken, e.g. based on the numerical value of the group label Zone_UUID. Another possibility is that the nodes have an internal lifetime counter with sufficient resolution, the current values of these counters are exchanged and the exchanged values compared. In any case when OwnerZones to be merged both have a Zone_Info_Data service, one of these services is disabled and the database of the remaining service is updated 310, e.g. merged, with the database of the disabled service.

An advantage of this two-step method is that in many cases arithmetical calculations can be avoided, and thus the decision may be found very quickly, without putting unnecessary strain on the negotiation peer.

When a peer is newly connected to a network, there may be one or more peer-groups or OwnerZones already connected, which may, but need not, periodically transmit or broadcast advertisement messages containing characteristics of the respective peer-group or OwnerZone, as described in WO02/057917 for peer-groups. Advertisement messages that are transmitted by peer-groups differ from advertisement messages that are transmitted by OwnerZones. Advertisement messages may contain group label and/or ZoneInfoData. Also, the new peer may, but needs not, have OwnerZone information already attached, like group label or ZoneInfoData. OwnerZone information that is attached to a peer is called herein "permanent".

In one embodiment of the invention a peer that is connected to a P2P network has no permanent OwnerZone information attached, and may receive advertisement messages from existing OwnerZones or other peer-groups. In that case, if it receives advertisement messages from only one OwnerZone, it may simply assume the existing OwnerZones group label, and thus join the OwnerZone. If otherwise it receives advertisement messages from more than one peer-group, it may select a valid OwnerZone by selecting an advertisement pointing to the peer-group that is the current OwnerZone. If otherwise it receives OwnerZone advertisement messages from more than one OwnerZone, it may select which OwnerZone to contact, e.g. according to user preferences.

In another embodiment of the invention the peer that is connected to a P2P network has no own permanent OwnerZone information attached, and receives no OwnerZone advertisement messages from the network. In that case a new OwnerZone may be created, as described above.

In another embodiment of the invention the peer that is connected to a P2P network has permanent OwnerZone information attached, but receives no peer-group advertisement messages from the network. In that case the new peer may maintain its OwnerZone information, and other peers in the network may instantiate, or join, the new peers OwnerZone.

In another embodiment of the invention the peer that is connected to a P2P network has permanent OwnerZone information attached, but also receives peer-group advertisement messages from the network. In that case the above-described zone management process may be performed.

The invention can be used for all kinds of devices that can be connected to a P2P network, particularly a P2P home network. These may be computers, but also other electronic devices such as TV, CD or DVD players/recorders or storage units. Furthermore, the method may be used not only for selecting an identification label, but also whenever a peer-group in a P2P network must come to a common decision.

What is claimed is:

1. A method for automatically assigning a common identifier to a target group of nodes in a network, wherein the target group of nodes is accessible by other nodes through said identifier, the target group of nodes being created by splitting a source group of nodes having assigned a source group identifier into said target group of nodes and a remainder, wherein the source group of nodes, the target group of nodes, and the remainder are peer groups, the method comprising:

determining automatically, via an electronic device, a node from said target group of nodes to execute the following steps, wherein the determined node has access to information characterizing said target group of nodes and to information characterizing the remainder;

comparing a plurality of features of said target group of nodes and the remainder, wherein the features are based on said characteristic information;

determining the common identifier for the target group of nodes based on the result of said comparison, wherein, the common identifier of either the target group or the remainder is the group identifier of said source group of nodes; and assigning the common identifier to the nodes of said target group of nodes, wherein values are assigned to the features and the values for each group of nodes are accumulated.

2. The method according to claim 1, wherein the compared features comprise a first and a second group of features, and the features belonging to said first group are compared in a predefined order and each of the features is rated higher than all subsequent features together, and the second group of features can be compared in any order.

3. The method according to claim 2, wherein the features belonging to the first group of features comprise the possibility to connect to external nodes, and the existence of trusted zones, wherein a trusted zone is another group of nodes where nodes from said target group of nodes or the remainder have individual access rights.

4. The method according to claim 2, wherein the features belonging to the second group of features comprise the number of nodes belonging to said target group of nodes or the remainder, or available memory space in said target group of nodes or the remainders.

5. The method according to claim 1, wherein the group of nodes is a peer-to-peer home network.

6. The method according to claim 1, wherein, the identifier of said source group of nodes is assigned either to said target group of nodes or to the remainder, the remainder being a group of nodes.

* * * * *